United States Patent
Gaskill et al.

(10) Patent No.: US 10,534,543 B2
(45) Date of Patent: Jan. 14, 2020

(54) USING COUNTERS TO EFFICIENTLY TRACK BUSY TIME OF STORAGE SYSTEMS

(71) Applicant: Micron Technology, Inc., Boise, ID (US)

(72) Inventors: Steven Gaskill, Campbell, CA (US); Kihoon Park, Cupertino, CA (US); Yin Feng Zhang, Shanghai (CN)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 15/996,287

(22) Filed: Jun. 1, 2018

(65) Prior Publication Data

US 2019/0369871 A1    Dec. 5, 2019

(51) Int. Cl.
*G06F 3/06* (2006.01)

(52) U.S. Cl.
CPC ............ *G06F 3/061* (2013.01); *G06F 3/0653* (2013.01); *G06F 3/0659* (2013.01); *G06F 3/0679* (2013.01)

(58) Field of Classification Search
CPC ...... G06F 3/061; G06F 3/0653; G06F 3/0659; G06F 3/0679
See application file for complete search history.

(56) References Cited

U.S. PATENT DOCUMENTS

| | | | |
|---|---|---|---|
| 2012/0131278 A1* | 5/2012 | Chang | G06F 12/0893 711/118 |
| 2015/0206589 A1* | 7/2015 | Liao | G11C 16/225 365/185.12 |
| 2019/0138437 A1* | 5/2019 | Bennett | G06F 12/023 |

* cited by examiner

*Primary Examiner* — David Yi
*Assistant Examiner* — Nicholas A. Paperno
(74) *Attorney, Agent, or Firm* — Nicholson De Vos Webster & Elliott LLP

(57) ABSTRACT

Methods and systems configured to increment one or more counters, including read command total, write command total, total blocks written and read, and low read or write queue depth, when a read or write command is received. When a request for a total device busy time is received, a total device busy time is determined and provided using one or more of the counters and one or more corresponding timing factors.

20 Claims, 6 Drawing Sheets

US 10,534,543 B2

USING COUNTERS TO EFFICIENTLY TRACK BUSY TIME OF STORAGE SYSTEMS

TECHNICAL FIELD

The present disclosure generally relates to tracking busy time of storage systems.

BACKGROUND ART

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to providing total busy time of a memory sub-system. A memory sub-system is also hereinafter referred to as a "memory device". An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

Conventional memory sub-systems use timers to measure how much time a memory sub-system has been in a busy state by starting a timer when the memory sub-system begins an operation and stopping the timer when the memory sub-system completes the operation. The time measured by the timer is added to a total busy time data structure maintained by the memory sub-system. The total busy time of the memory sub-system is indicative of the health of the memory sub-system. Due to the computing time required to create, start, and stop a timer accurately, conventional timer-based approaches to measuring total busy time have a deleterious impact on the performance of the memory sub-system due to the computing time required to manage the timers.

Aspects of the present disclosure address the above and other deficiencies by efficiently measuring total busy time using counters and timing factors. The counters are incremented by the memory sub-system when a new operation is performed, and a total busy time is generated asynchronously from normal memory sub-system operations by multiplying a value of the counters by timing factors. Since incrementing a counter is faster than starting or stopping a timer, the performance impact from tracking total busy time is reduced.

Figure 1:
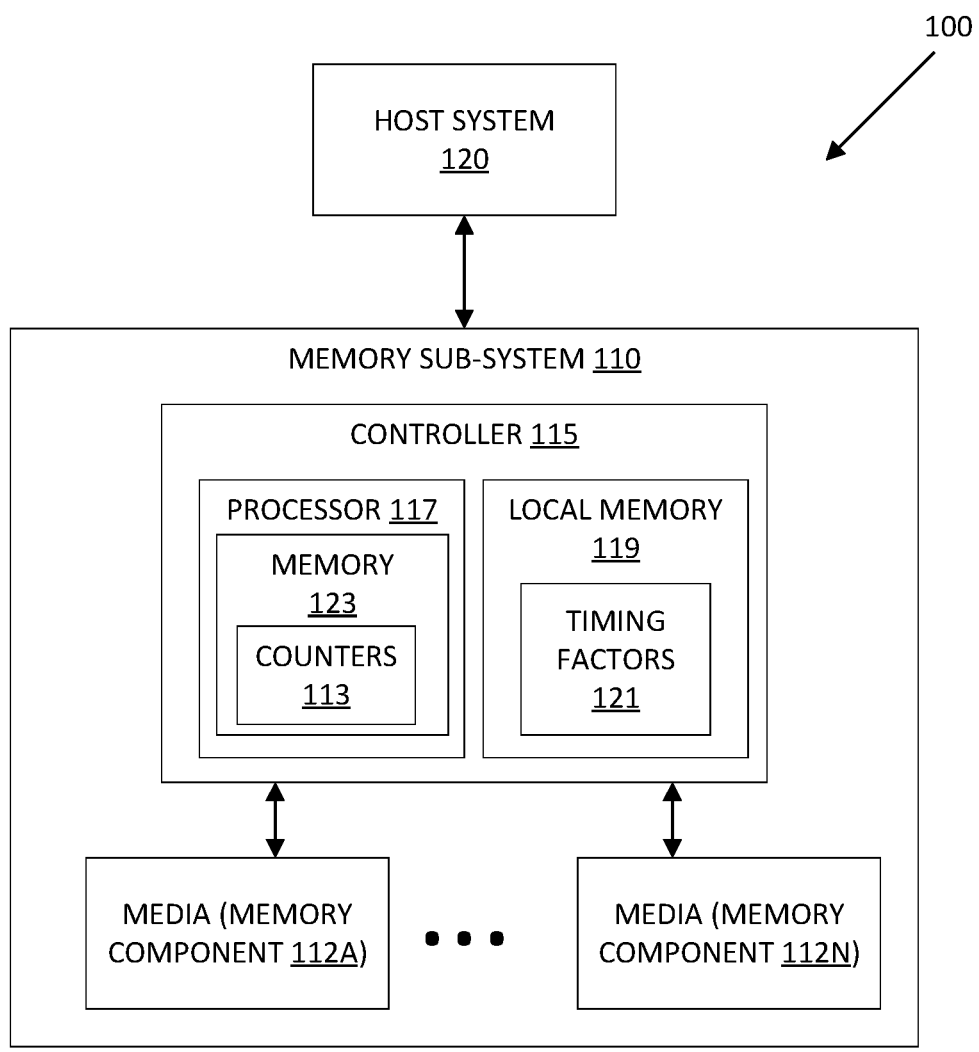
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is an SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, controller 115 includes multiple specialized processors (e.g., CPU cores, ASIC, etc.) linked together that can be used to create an operation pipeline. The pipeline allows the multiple processors to perform multiple operations, e.g., by assigning each processor to perform a different part of an operation. In one embodiment, one of the specialized processors receives incoming operations to be performed and messages confirming that operations have been completed. In one embodiment, a completed operation has a confirmation message pass back through the pipeline. In this embodiment, this specialized processor is responsible for managing counters component 113. In other embodiments, different processors manage different aspects of counters component 113. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes counters component 113 and timing factors component 121 that can be used to count the number of operations, size of operations, and queue depth threshold count(s) for read and write operations according to some embodiments and described in greater detail below. In some embodiments, the controller 115 includes at least a portion of the counters component 113 and timing factors component 121. For example, the controller 115 can include a processor 117 (processing device) configured to execute instructions stored in local memory 119 for performing the operations described herein. In some embodiments, the counters component 113 and/or timing factors component 121 is part of the host system 110, an application, or an operating system. In one embodiment, counters component 113 is stored in processor memory 123. Processor memory 123 may be low-latency non-cache volatile memory physically located within processor 117 and may be referred to as tightly-coupled memory.

The counters component 113 can include one or more counters that can be implemented as variables in memory (e.g., processor memory 123 and/or local memory 119) storing a number which can be incremented when an event occurs, e.g., when a new read operation is processed by memory sub-system 110. The timing factors component 121 can include one or more variables in memory (e.g., local memory 119) that store a factor that, when multiplied by a counter, produces an estimated amount of time. Further details with regard to the operations of the counters component 113 and timing factors component 121 are described below.

Figure 2:
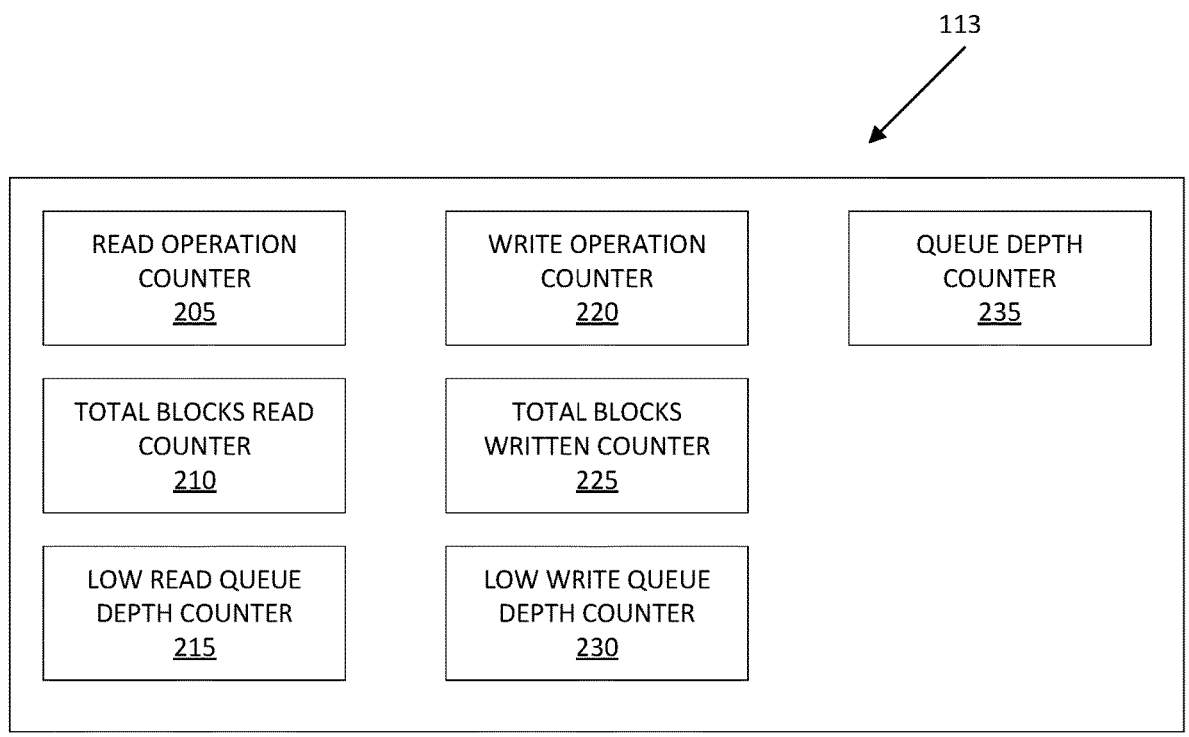
FIG. 2 illustrates the counters component in greater detail in accordance with some embodiments of the present disclosure.

FIG. 2 illustrates the counters component 113 in greater detail in accordance with some embodiments of the present disclosure. The individual counters within counters component 113 can be managed according to the methods illustrated in FIGS. 3-5.

Read operation counter 205 stores the approximate number of read operations performed by memory sub-system 110. As described in greater detail elsewhere in this disclosure, the number of read operations performed by memory sub-system 110 is used to approximate the total device busy time.

Total blocks read counter 210 stores the approximate total number of blocks read by the memory sub-system. As described in greater detail elsewhere in this disclosure, the total number of blocks read by the memory device are used to increase the accuracy of the total device busy time by accounting for the incremental increase to read operation duration attributable to the number of data blocks being read.

Low read queue depth counter 215 stores the approximate number of read operations performed while the queue depth counter 235 is lower than a threshold value. The threshold value can be specified externally. As described in greater detail elsewhere in this disclosure, the low read queue depth counter 215 is used to adjust the total device busy time to account for the increased per-read operation time cost when the read queue depth is less than the threshold value.

Write operation counter 220 stores the total number of write operations performed by the memory sub-system 110. As described in greater detail elsewhere in this disclosure, the number of write operations performed by memory sub-system 110 is used to approximate the total device busy time.

Total blocks written counter 210 stores the approximate total number of blocks written by the memory sub-system. As described in greater detail elsewhere in this disclosure, the total number of blocks written by the memory device are used to increase the accuracy of the total device busy time by accounting for the incremental increase to write operation duration attributable to the number of data blocks being written.

Low write queue depth counter 230 stores the approximate number of write operations performed while the queue depth counter 235 is lower than a threshold value. The threshold value can be specified externally. As described in greater detail elsewhere in this disclosure, the low write queue depth counter 230 is used to adjust the total device busy time to account for the increased per-write operation time cost when the write queue depth is less than the threshold value.

Queue depth counter 235 stores the current number of read and write operations in the queue (e.g., the operation pipeline). As described in greater detail elsewhere in this disclosure, the queue depth counter 235 is incremented when new operations are added to the operation queue and decremented when operations are completed and removed from the operation queue. Queue depth counter 235 may be managed using the method illustrated in FIG. 5.

In one embodiment, the values stored in counters 205-235 are written to non-volatile memory (e.g., one or more of memory components 112A-112N) each time interval, in addition to when the memory sub-system is shut down. Accordingly, the values in 205-235 can be approximate because an unexpected power loss can cause the values to be lost between time intervals. This unexpected power loss may cause the changes to counters 205-235 following the last time interval caused a write to non-volatile memory.

Figure 3:
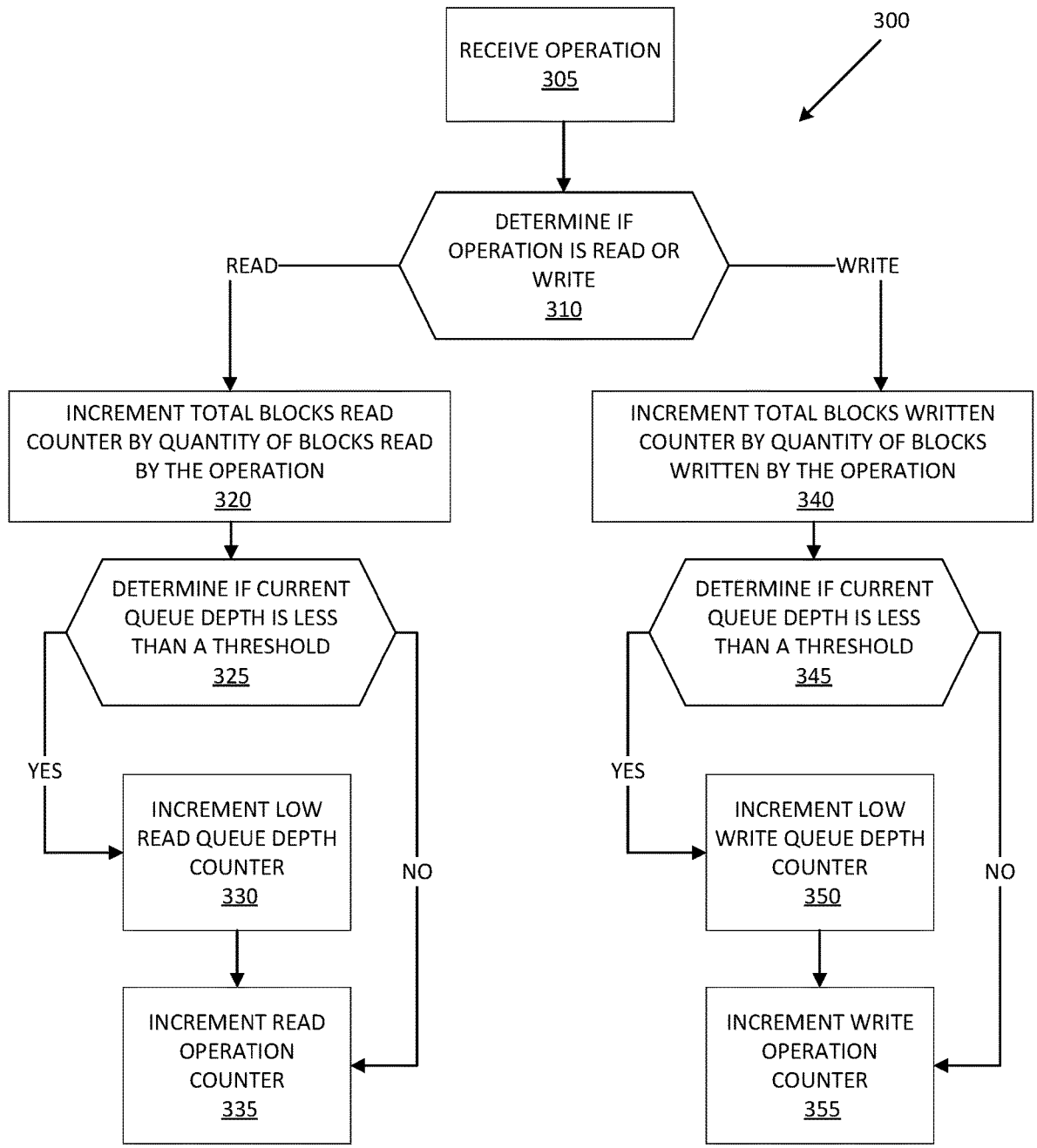
FIGS. 3 and 4 are flow diagrams of example methods to provide total busy time of a memory sub-system in accordance with some embodiments of the present disclosure.
Figure 4:
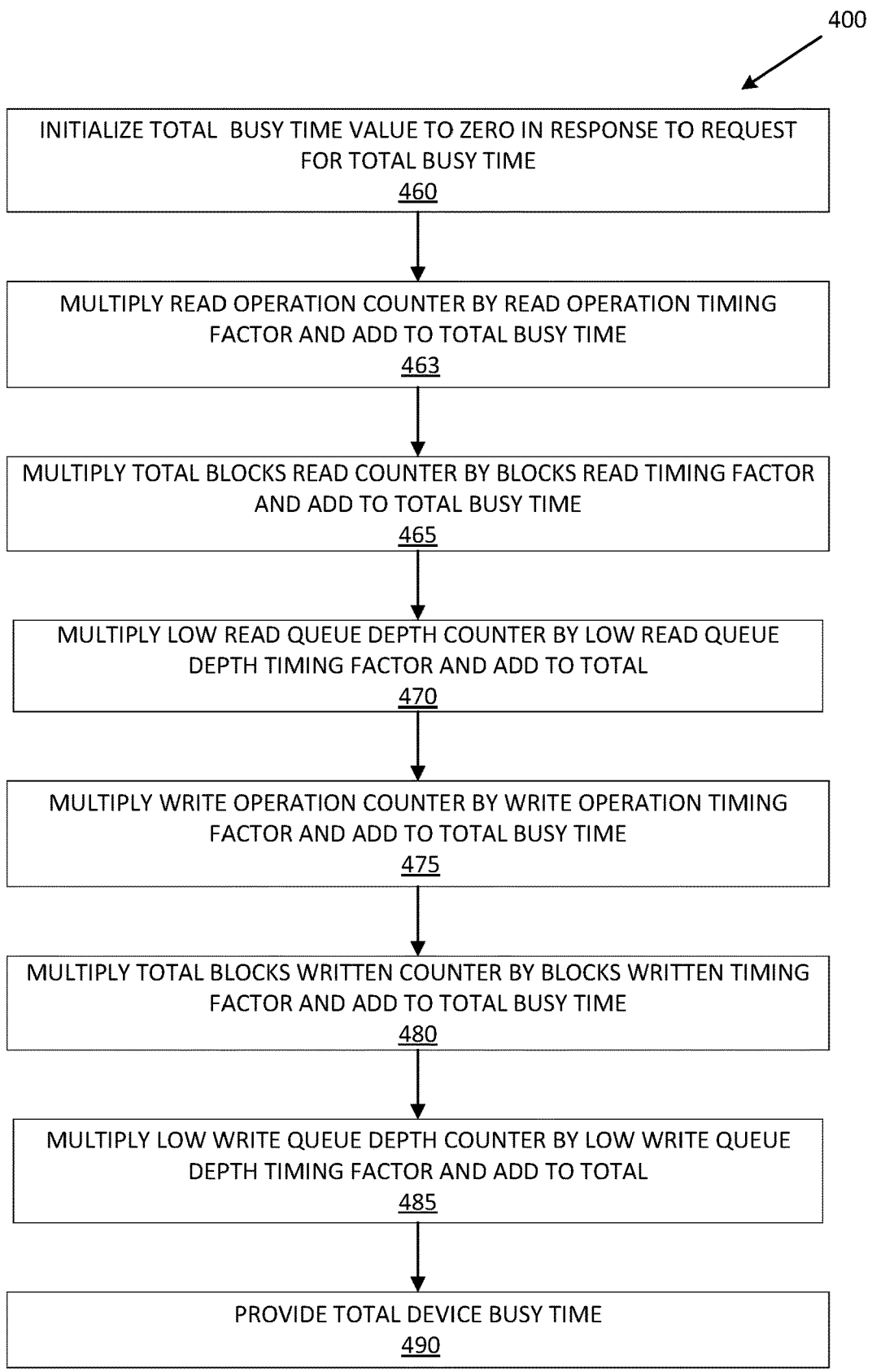

FIGS. 3 and 4 are flow diagrams of example methods 300 and 400 to provide total busy time of a memory sub-system, in accordance with some embodiments of the present disclosure. The methods 300 and 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, methods 300 and 400 are performed using the counters component 113 and timing factors component 121 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 305, the processing device receives an operation. In one embodiment, this operation may be a read operation or a write operation. A read operation reads data from memory (e.g., memory component 112A-112N) and includes a memory address and an amount of data to read (e.g., a quantity of data blocks). A write operation writes data to memory (e.g., memory component 112A-112N) and includes a memory address and an amount of data to write. In other embodiments, the operation is an administrative operation that, for the purpose of determining and providing busy time, the processing device ignores because it doesn't contribute to total device busy time.

At block 310, if the processing device determines that the operation is a read operation, the processing device transitions to block 320 and increments a total blocks read counter by a quantity of data blocks read by the read operation. In one embodiment, the total blocks read counter is a 64 bit integer variable residing in processor memory 123. If at block 325 the processing devices determines that the current operation queue depth is less than a queue depth threshold, the processing device transitions to block 330 and increments a low queue depth counter 330 and then transitions to block 335 and increments the read operation counter. Otherwise, the processing device bypasses block 330 and transitions directly to increment the read operation counter at block 335. In one embodiment, the queue depth threshold is included in or otherwise stored with timing factors 121. In other embodiments, the queue depth threshold is stored elsewhere, such as local memory 119 and/or non-volatile memory components 112A-112N.

If the processing device determines at block 310 that the operation is a write operation, the processing device transitions to block 340 and increments the total blocks written counter by a quantity of data blocks written by the write operation. If at block 345 the processing device determines that the current operation queue depth is less than a queue depth threshold, the processing device increments the low write queue depth counter at block 330 before incrementing the write operation counter at block 355. Otherwise, the processing device bypasses block 350 and proceeds directly to block 355 and increments the write operation counter.

At block 460, the processing device initializes a total busy time variable to zero in response to a request for total device busy time of the memory sub-system 110. In one embodiment, the request for the total busy time of the memory sub-system 110 is received from host system 120. The variable storing the total busy time can reside in local memory 119. In another embodiment, total device busy time is saved in non-volatile memory and counters 113 are reset when total device busy time is requested and calculated/updated. In this embodiment, the newly calculated total device busy time is added to the previously stored total device busy time to update the total device busy time.

At block 463, the processing device multiplies the value of the read operation counter by the read operation timing factor and adds the result to the total busy time. In one embodiment, the read operation counter reflects the approximate number of read operations performed by the memory sub-system 110 and the read operation timing factor is the approximate amount of time units the memory sub-system 110 requires to perform a read operation. Accordingly, multiplying the read operation counter by the read operation timing factors produces the approximate amount of time the memory sub-system 110 has spent performing read operations.

At block 465, the processing devices multiplies the total blocks read counter by the blocks read timing factor and adds the result to the total busy time. In one embodiment, the total blocks read counter reflects the approximate number of data blocks from memory components 112A-112N and the blocks read timing factor reflects the incremental amount of additional time spent performing read operations attributable to the number of data blocks read by the read operations.

At block 470, the processing device multiplies the low read queue depth counter by the low read queue depth timing factor and adds the result to the total busy time. In one embodiment, read operations are performed using a pipeline and multiple processors 117. The pipeline can be implemented as one or more data structures in processor memory 123 and local memory 119. The time required to perform a read operation may depend upon the efficiency of the pipeline that in turn depends upon the number of read operations in the pipeline. The number of read operations in the pipeline may be referred to as the read operation queue depth. In one embodiment, the memory sub-system 110 is busy if any part of the pipeline is actively performing a read operation. If one operation is in the pipeline, the busy time is attributable to that read operation. If multiple operations are in the pipeline, a portion of the busy time is attributable to each read operation. Accordingly, as the number of read operations in the pipeline (e.g., read queue depth) decreases, the time attributable to a read operation increases. This is reflected in blocks 325 and 345. If the read queue depth is below a threshold, the low read queue depth counter is incremented at blocks 330 and 350. At block 470, the low read queue depth counter is multiplied by the low read queue depth timing factor and added to the total busy time. In one embodiment, this results in an adjustment to the total busy time that reflects the additional time spent by the memory sub-system 110 performing read operations with fewer read operations in the pipeline and therefore spending more time per read operation. In one embodiment, the threshold corresponds to a full queue.

At block 475, the processing device multiplies the write operation counter by the write operation timing factor and adds the result to the total busy. In one embodiment, this adds an approximate amount of time spent by the memory sub-systems 110 performing write operations for similar reasons to those described in relation to the read operation counter.

At block 480, the processing device multiplies the total blocks written counter by the blocks written timing factor and adds the result to the total busy time. In one embodiment, this adjusts the amount of time spent performing write operations to reflect the added time attributable to the number of blocks written for similar reasons to those described in relation to the total blocks read counter.

At block 485, the processing device multiplies the low write queue depth counter by the low write queue depth timing factor and adds the result to the total busy time. In one embodiment, this adjusts the amount of time spent performing write operations when a low write operation queue depth causes an increase in per-write operation busy time for similar reasons to those described in relation to the low read queue depth counter. In one embodiment, the threshold corresponds to a full queue.

At block 490, the processing device provides the total device busy time. In one embodiment, the processing device provides the total device busy time in response to a request from host system 120. In some embodiments, a tuning time factor is multiplied by the total device busy time and the resulting time is added to or replaces the total device busy time. The tuning time factor may be used to increase the accuracy of the estimated total device busy time based on empirical analysis of a particular memory sub-system, for example at the factory.

Figure 5:
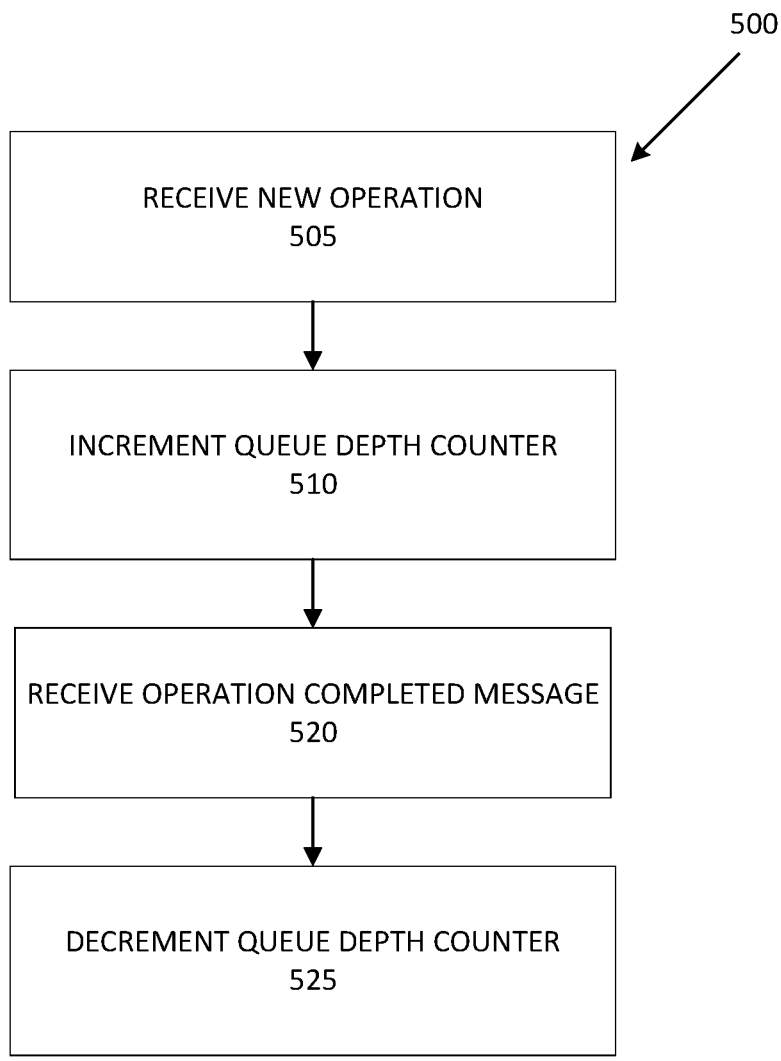
FIG. 5 is a flow diagram of an example method to manage read and write queue depth counters in accordance with some embodiments of the present disclosure.

FIG. 5 is a flow diagram of an example method 500 to manage the queue depth counter in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed using the counters component 113 of FIG. 1.

At block 505, the processing device receives a new operation. At block 510, the processing device increments the queue depth counter in response to receiving the new operation.

At block 520, the processing device receives an operation completed message. At block 525, the processing device decrements the queue depth counter in response to the operation completed message.

As described in greater detail elsewhere in this disclosure, the method 500 may be performed by a processing device that includes one or more processors. In one embodiment, a single processor performs each block of the method 500, while in other embodiments different processors or processor cores in the processing device perform different parts of the method 500. For example, one processor or core may increment the queue depth counters and a different processor or core decrements the queue depth counters.

In one embodiment, when memory sub-system 110 is powered on, saved values for counters 113 are copied from non-volatile memory (e.g., memory components 112A-112N) into volatile memory (e.g., memory 123). When memory sub-system 110 is powered down, the reverse occurs: current values of 113 are persisted to non-volatile memory.

Figure 6:
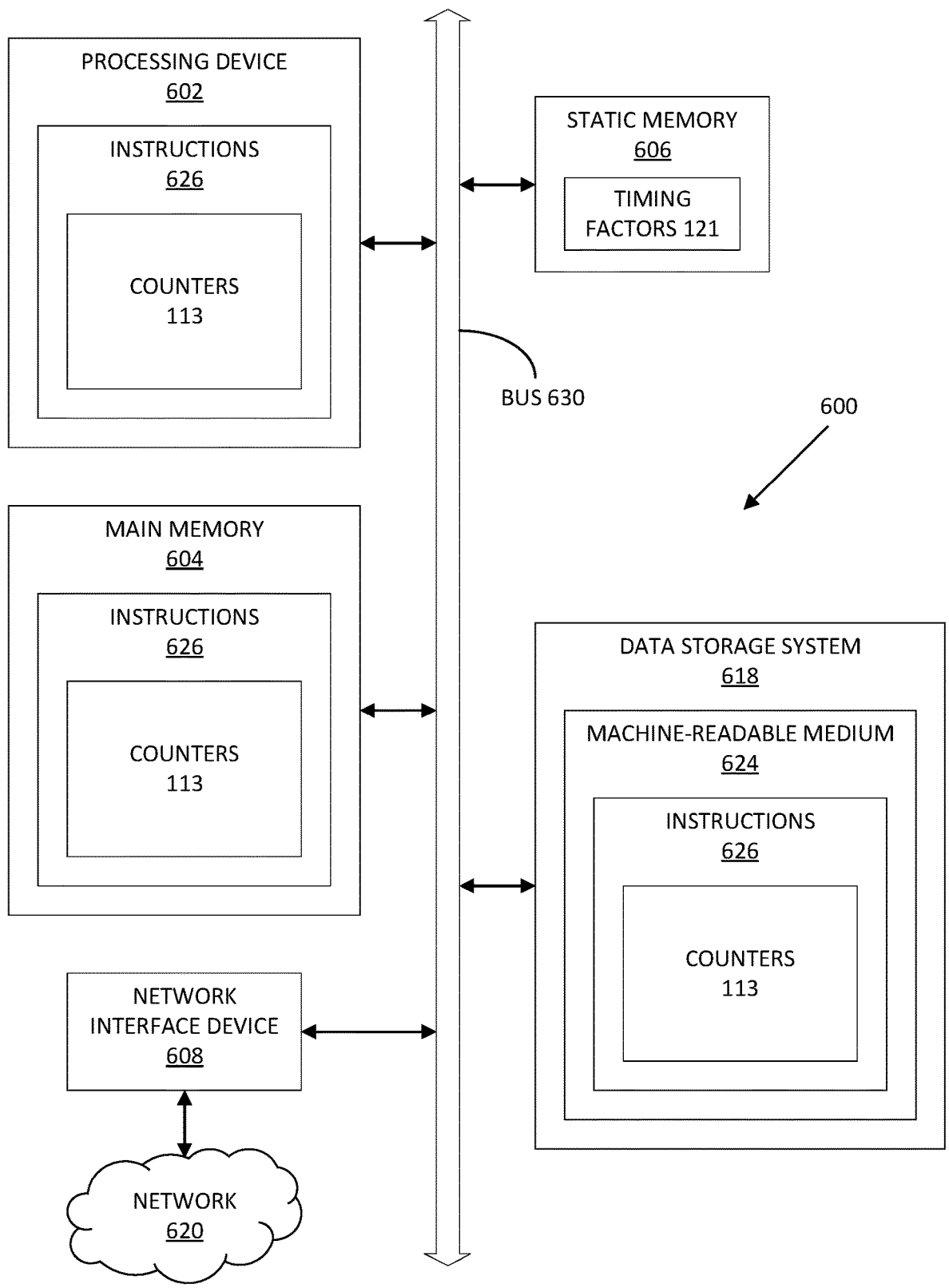
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations using the counters component 113 and timing factors component 121 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to use of counters component and timing factors component (e.g., the counters component 113 and timing factors component 121 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. For example, a computer system or other data processing system, such as the controller 115, may carry out the computer-implemented methods 300, 400, and 500 in response to its processor executing a computer program (e.g., a sequence of instructions) contained in a memory or other non-transitory machine-readable storage medium or non-transitory computer-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computer implemented method comprising:
    detecting an operation to a memory sub-system;
    in response to detecting the operation, incrementing an operation counter corresponding to the operation and incrementing a block counter by a quantity of data blocks associated with the operation;
    identifying a timing factor for the operation;
    determining a total memory sub-system busy time based on the operation counter, the block counter, and the timing factor in response to a request for busy time; and
    providing the total memory sub-system busy time further in response to the request.

2. The method of claim 1, wherein incrementing the operation counter and block counter comprises:
    in response to determining that the operation is a read operation:
        incrementing a read operation counter indicating a quantity of read operations;
        incrementing a total blocks read counter by a quantity of data blocks read by the operation;
    in response to determining that the operation is a write operation:
        incrementing a write operation counter indicating a quantity of write operations;
        incrementing a total blocks written counter by a quantity of data blocks written by the operation.

3. The method of claim 2, wherein determining the total memory sub-system busy time comprises:
    computing a sum of the following:
        a result of multiplying the read operation counter by a read operation timing factor;
        a result of multiplying the total blocks read counter by a blocks read timing factor;
        a result of multiplying the write operation counter by a write operation timing factor;
        a result of multiplying the total blocks written counter by a blocks written timing factor.

4. The method of claim 3, further comprising:
    in response to determining that the operation to the memory sub-system is the read operation:
        incrementing a low read queue depth counter if a current operation queue depth is less than a queue depth threshold;
    in response to determining that the operation to the memory sub-system is the write operation:
        incrementing a low write queue depth counter if the current operation queue depth is less than the queue depth threshold;
    wherein generating the total memory sub-system busy time further comprises computing adding the following to the total memory sub-system busy time:
        a result of multiplying the low read queue depth counter by a low read queue depth timing factor; and
        a result of multiplying the low write queue depth counter by a low write queue depth timing factor.

5. The method of claim 4, wherein the current operation queue depth is a counter incremented by a processor when the operation is added to a queue and decremented by the processor when the operation is completed.

6. The method of claim 4, wherein the low read queue depth timing factor corresponds to a per-read operation time increase when the memory sub-system is processing less than a threshold number of input/output operations.

7. The method of claim 1, wherein generating the busy time further comprises:
    computing a tuning adjustment time by multiplying the total memory sub-system busy time by a tuning time factor; and
    adding the tuning adjustment time to the total memory sub-system busy time.

8. A non-transitory computer-readable storage medium comprising instructions that, when executed by a processing device, cause the processing device to:
    in response to determining that an operation to a memory sub-system is a read operation:
        incrementing a read operation counter indicating a quantity of read operations;
        incrementing a total blocks read counter by a quantity of data blocks read by the operation;
    in response to determining that the operation to the memory sub-system is a write operation:
        incrementing a write operation counter indicating a quantity of write operations;
        incrementing a total blocks written counter by a quantity of data blocks written by the operation;
    in response to receiving a request for total device busy time, generating the total device busy time by computing a sum of the following:
        a result of multiplying the read operation counter by a read operation timing factor;
        a result of multiplying the total blocks read counter by a blocks read timing factor;
        a result of multiplying the write operation counter by a write operation timing factor;
        a result of multiplying the total blocks written counter by a blocks written timing factor; and
    providing the total device busy time.

9. The non-transitory computer-readable storage medium of claim 8, the instructions further comprising:
    in response to determining that the operation to the memory sub-system is the read operation:
        incrementing a low read queue depth counter if a current operation queue depth is less than a queue depth threshold;
    in response to determining that the operation to the memory sub-system is the write operation:
        incrementing a low write queue depth counter if the current operation queue depth is less than the queue depth threshold;
    wherein generating the total device busy time further comprises computing adding the following to the total device busy time:
        a result of multiplying the low read queue depth counter by a low read queue depth timing factor; and
        a result of multiplying the low write queue depth counter by a low write queue depth timing factor.

10. The non-transitory computer-readable storage medium of claim 9, the instructions further comprising:
    initializing the memory sub-system, wherein initializing the memory sub-system includes reading the read operation counter, the total blocks read counter, the low read queue depth counter, the write operation counter, the total blocks written counter, and the low write queue depth counter from a non-volatile memory to a volatile memory.

11. The non-transitory computer-readable storage medium of claim 9, the instructions further comprising:
powering off the memory sub-system, wherein powering off the memory sub-system includes writing the read operation counter, the total blocks read counter, the low read queue depth counter, the write operation counter, the total blocks written counter, and the low write queue depth counter from a volatile memory to a non-volatile memory.

12. The non-transitory computer-readable storage medium of claim 9, wherein the current operation queue depth is a counter incremented by a processor when the operation is added to a queue and decremented by the processor when the operation is completed.

13. The non-transitory computer-readable storage medium of claim 9, wherein the low read queue depth timing factor corresponds to a per-read operation time increase when the memory sub-system is processing less than a threshold number of input/output operations.

14. The non-transitory computer-readable storage medium of claim 8, wherein generating the total device busy time further comprises:
computing a tuning adjustment time by multiplying the total device busy time by a tuning time factor; and
adding the tuning adjustment time to the total device busy time.

15. A memory sub-system comprising:
a memory component; and
a processing device, coupled to the memory component, configured to:
in response to determining that an operation to the memory sub-system is a read operation:
increment a read operation counter indicating a quantity of read operations;
increment a total blocks read counter by a quantity of data blocks read by the operation;
in response to determining that the operation to the memory sub-system is a write operation:
increment a write operation counter indicating a quantity of write operations;
increment a total blocks written counter by a quantity of data blocks written by the operation;
in response to receiving a request for total device busy time, generating the total device busy time by computing a sum of the following:
a result of multiplying the read operation counter by a read operation timing factor;
a result of multiplying the total blocks read counter by a blocks read timing factor;
a result of multiplying the write operation counter by a write operation timing factor;
a result of multiplying the total blocks written counter by a blocks written timing factor; and
provide the total device busy time.

16. The memory sub-system of claim 15, further configure to:
in response to determining that the operation to the memory sub-system is the read operation:
increment a low read queue depth counter if a current operation queue depth is less than a queue depth threshold;
in response to determining that the operation to the memory sub-system is the write operation:
increment a low write queue depth counter if the current operation queue depth is less than the queue depth threshold;
wherein generating the total device busy time further comprises computing adding the following to the total device busy time:
a result of multiplying a low read queue depth counter by a low read queue depth timing factor, wherein the low read queue depth timing factor corresponds to an approximate amount of time per-read operation increase when the memory sub-system is processing less operations than the queue depth threshold number of operations; and
a result of multiplying a low write queue depth counter by a low write queue depth timing factor, wherein the low write queue depth timing factor corresponds to an approximate amount of time per-write operation increase when the memory sub-system is processing less operations than the queue depth threshold number of operations.

17. The memory sub-system of claim 16, further configured to:
initializing the memory sub-system, wherein initializing the memory sub-system includes reading the read operation counter, the total blocks read counter, the low read queue depth counter, the write operation counter, the total blocks written counter, and the low write queue depth counter from a non-volatile memory to a volatile memory.

18. The memory sub-system of claim 16, further configured to:
powering off the memory sub-system, wherein powering off the memory sub-system includes writing the read operation counter, the total blocks read counter, the low read queue depth counter, the write operation counter, the total blocks written counter, and the low write queue depth counter from a volatile memory to a non-volatile memory.

19. The memory sub-system of claim 16, wherein the current operation queue depth is a counter incremented by a processor in the processing device when the operation is added to a queue and decremented by the processor when the operation is completed.

20. The memory sub-system of claim 15, wherein generating the total device busy time further comprises:
computing a tuning adjustment time by multiplying the total device busy time by a tuning time factor; and
adding the tuning adjustment time to the total device busy time.

* * * * *